United States Patent [19]

Williams

[11] Patent Number: 5,228,415

[45] Date of Patent: Jul. 20, 1993

[54] ENGINES FEATURING MODIFIED DWELL

[76] Inventor: Thomas H. Williams, 4009 Wembley Forest Way, Doraville, Ga. 30340

[21] Appl. No.: 716,943

[22] Filed: Jun. 18, 1991

[51] Int. Cl.⁵ .......................................... F02B 33/06
[52] U.S. Cl. ........................ 123/51 R; 123/58 AA; 123/70 R; 123/560; 123/197.1
[58] Field of Search .................. 123/70 R, 70 V, 560, 123/56 R, 56 AC, 56 BC, 197.1, 197.4, 58 A, 58 AA, 51 BC, 51 R, 68; 60/620, 622

[56] References Cited

U.S. PATENT DOCUMENTS

| | | |
|---|---|---|
| 1,091,629 | 3/1914 | Campbell . |
| 1,114,521 | 10/1914 | Reese et al. . |
| 1,372,216 | 3/1921 | Casaday . |
| 1,443,885 | 1/1923 | Owen ................................ 123/560 |
| 1,512,673 | 10/1924 | Breguet . |
| 1,583,668 | 5/1926 | Davidson . |
| 1,595,022 | 8/1926 | Powell . |
| 1,609,371 | 12/1926 | Leissner . |
| 1,634,468 | 7/1927 | Muller ................................ 123/560 |
| 1,725,139 | 8/1929 | Hetlesater ......................... 123/70 R |
| 1,793,975 | 2/1931 | Clair ................................. 123/70 R |
| 1,873,908 | 8/1932 | Schinke . |
| 2,136,293 | 11/1938 | Gentry . |
| 2,176,300 | 10/1939 | Fette ................................. 123/70 R |
| 2,315,011 | 3/1943 | Quiroz . |
| 3,558,845 | 9/1931 | Maher ............................... 123/70 R |
| 3,880,126 | 4/1975 | Thurston et al. ............... 123/65 VD |
| 3,895,614 | 7/1975 | Bailey ............................... 123/58 A |
| 4,170,970 | 10/1979 | McCandless ...................... 123/70 R |
| 4,506,634 | 3/1985 | Kerrebrock ........................... 123/68 |
| 4,715,326 | 12/1987 | Thring ............................. 123/70 R |
| 4,887,558 | 12/1989 | Bernard ........................... 123/70 R |

FOREIGN PATENT DOCUMENTS

| | | | |
|---|---|---|---|
| 747317 | 1/1944 | Fed. Rep. of Germany .... | 123/70 R |
| 344085 | 3/1931 | United Kingdom ............. | 123/70 R |

Primary Examiner—David A. Okonsky
Attorney, Agent, or Firm—Kilpatrick & Cody

[57] ABSTRACT

Novel reciprocating engines which feature conversion units each formed of an expansion cylinder, a compression cylinder and a passageway connecting the two. Pistons in the cylinders are preferably connected via a four-bar or other linkage to the crank so that the compression piston remains at substantially top dead center for a substantial portion of the stroke of the expansion piston, and vice versa. Communication between the cylinders via the passageway may thus be continuously open with no substantial pressure drop between cylinders. Fuel may be injected into the air or other gas moving between cylinders giving an internal combustion engine, or the gas may be heated by external means. Devices according to this concept limit peak pressure and temperatures, resulting in the formation of fewer nitrous oxides. The expansion displacement volume may be larger than the compression displacement volume, and the strokes of the compression and expansion pistons may differ, in order to provide fuller expansion of the combustion gases and increase efficiency.

39 Claims, 9 Drawing Sheets

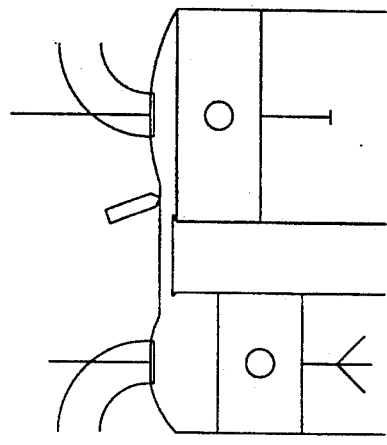
FIG. 1B COMPRESSION
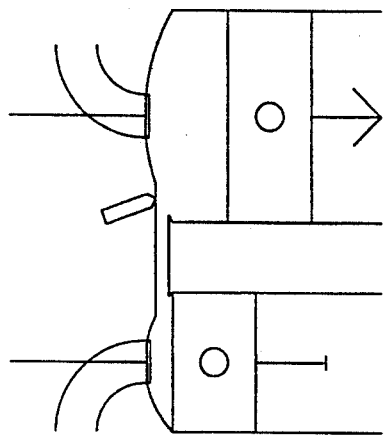
FIG. 1C EXPANSION
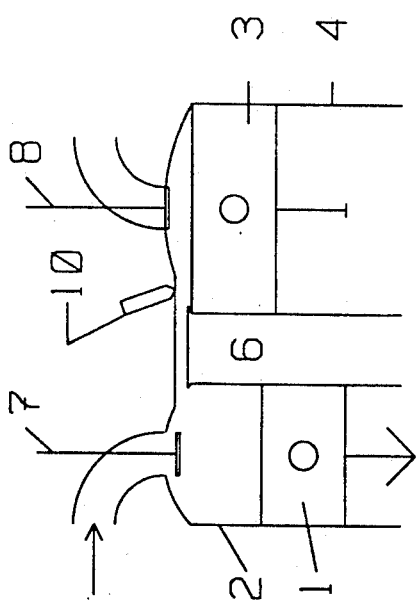
FIG. 1A INTAKE STROKE
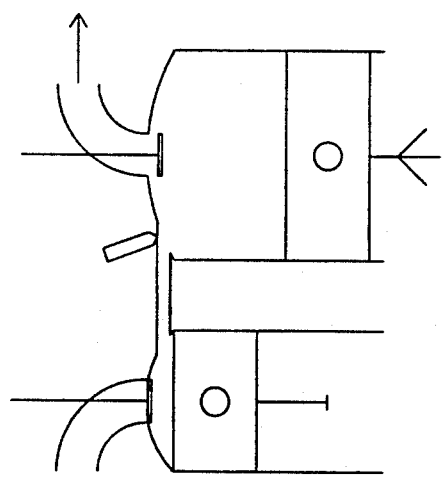
FIG. 1D EXHAUST STROKE

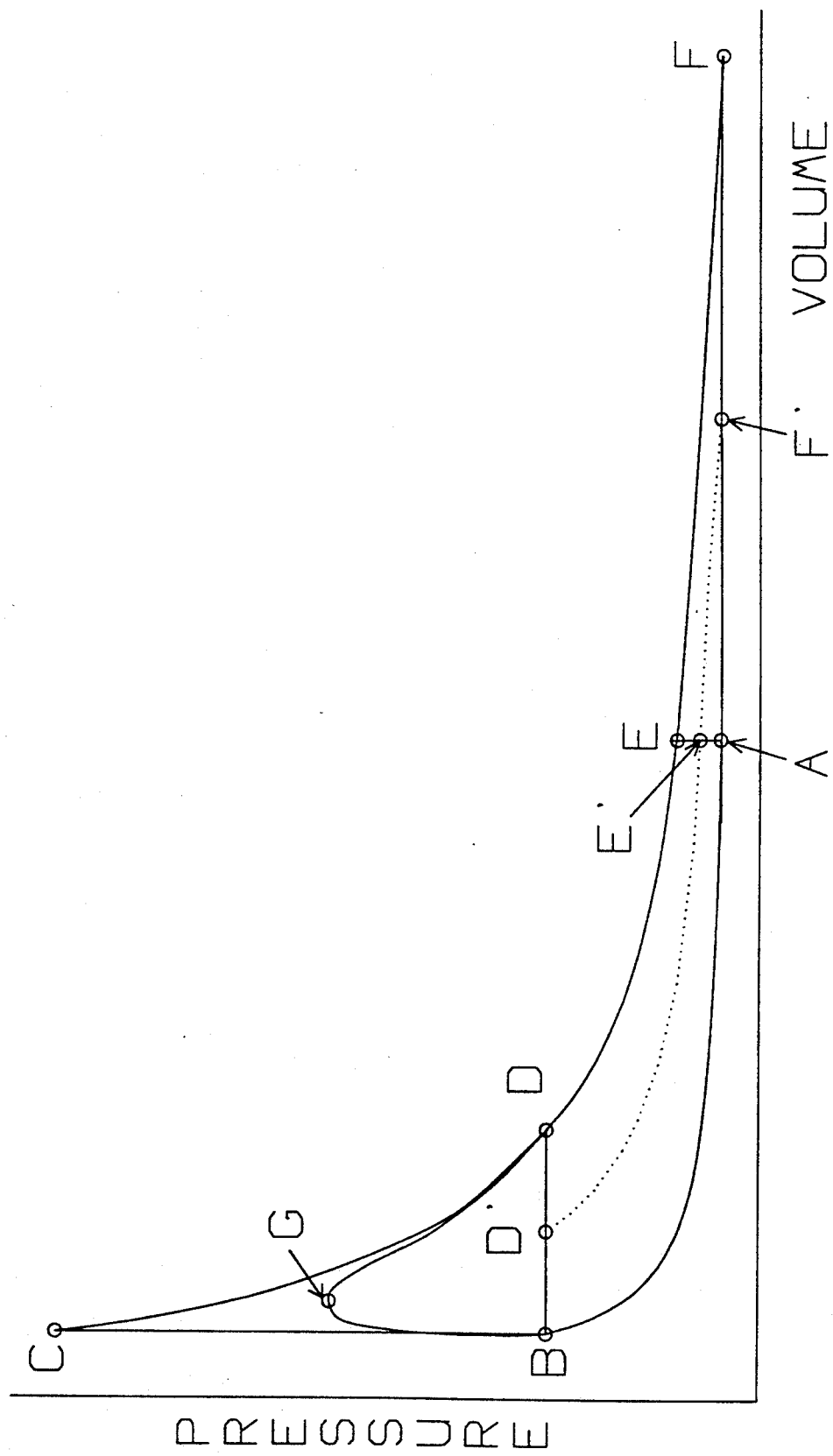

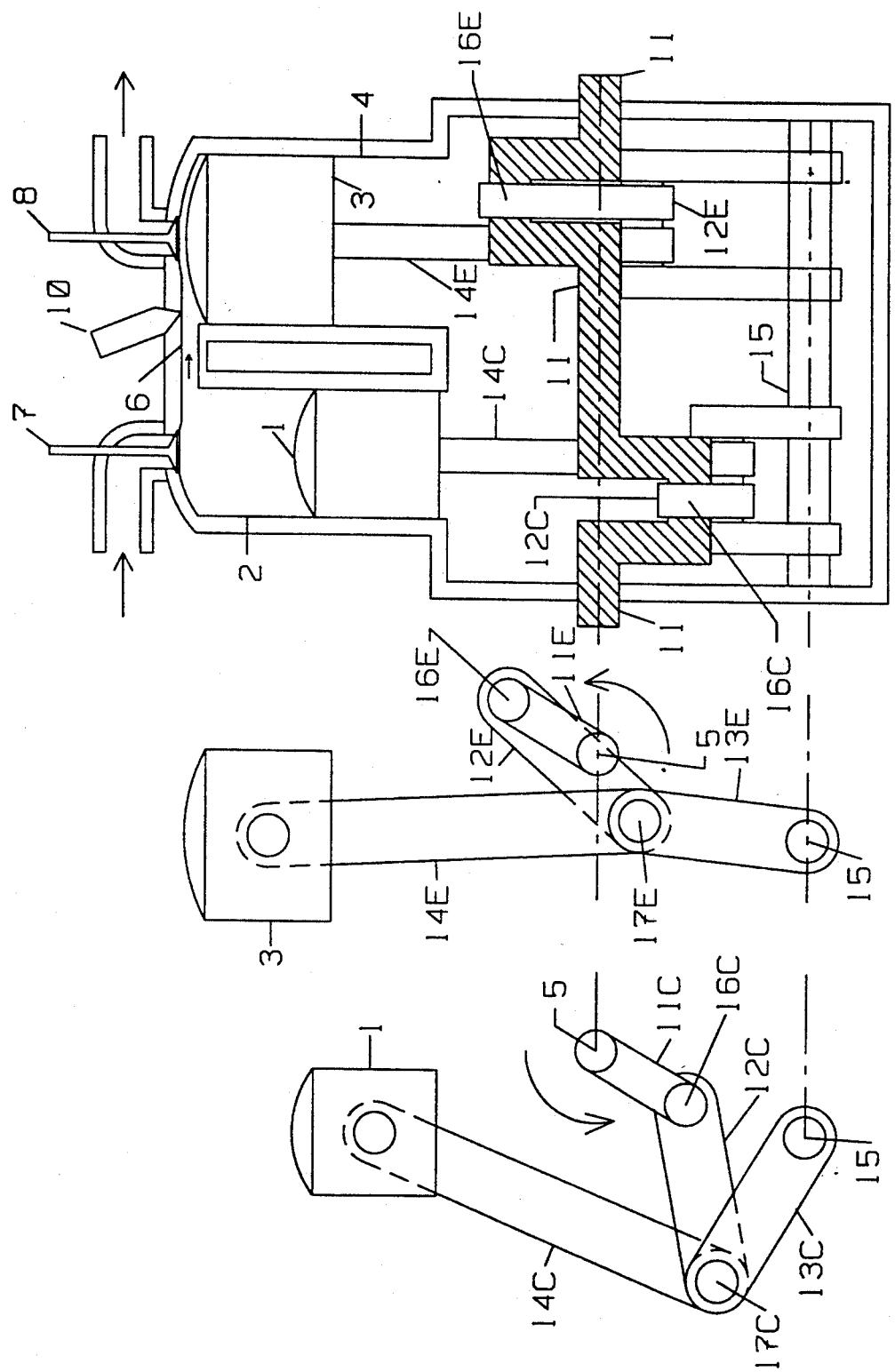

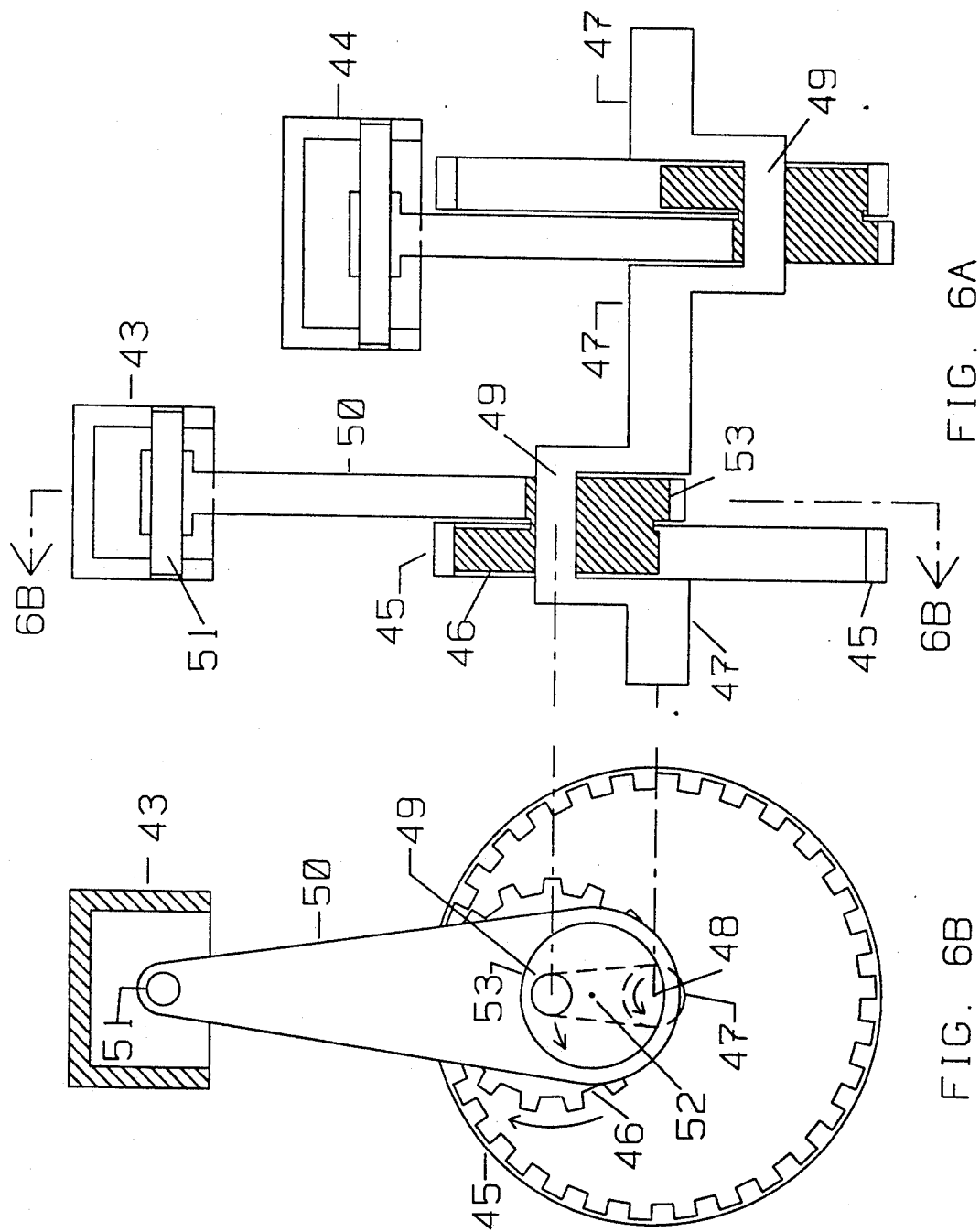

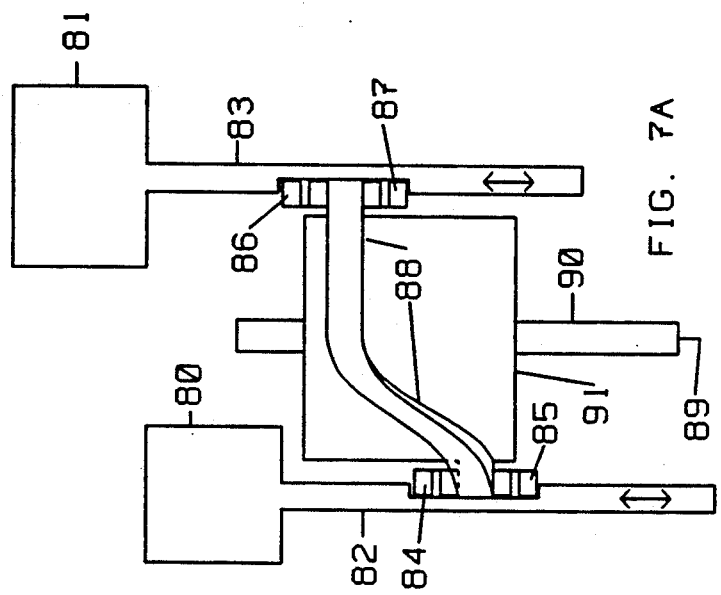
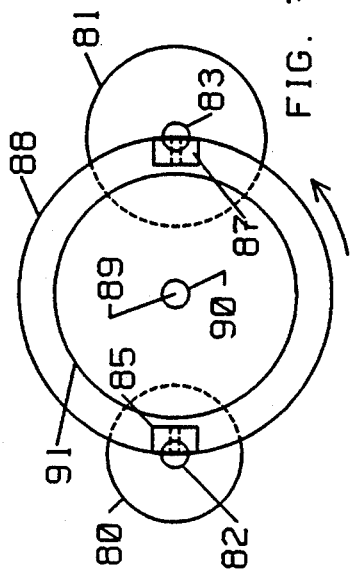
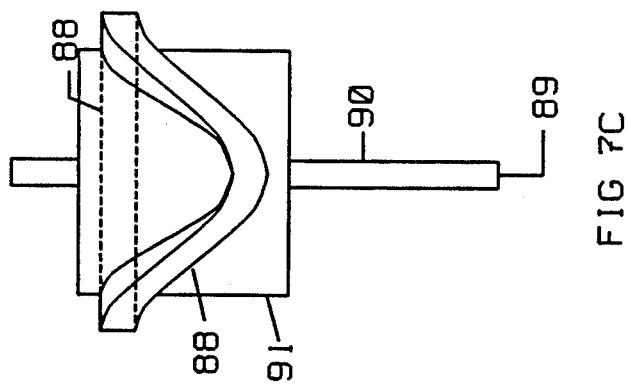

ENGINES FEATURING MODIFIED DWELL

The present invention relates to engines which feature separate compression and expansion cylinders acting in combination with modified dwell in order to increase thermodynamic efficiencies.

BACKGROUND OF THE INVENTION

Internal combustion engines of the present invention exhibit improved fuel economy, lower pollution and superior operating characteristics relative to engines in use or currently proposed as of the date of this document. Currently in common use are four cycle-spark ignition (SI) and four-cycle compression ignition (CI) engines. In both cases, four phases of the cycle correspond to strokes of the piston: intake, compression, expansion, and exhaust.

FIG. 2 is an ideal gas diagram which is useful when considering theory of operation of four-cycle engines and engines of the present invention. FIG. 2 plots pressure as a function of volume for a charge of gas in an engine during the four phases. The area inside the enclosed curves is proportional to the work done per cycle by the gas. During the intake and compression phases, the gas is drawn into a chamber, and then compressed, respectively. The compression phase is shown by a movement from point A to B in FIG. 2. Point A is the point of maximum cylinder volume, and point B is the point of minimum cylinder volume. The path traced by the line A-B is considered to be adiabatic, that is, without loss or gain of heat. In the CI engine, only air is compressed. In the SI case, the air is premixed in a precisely controlled fashion with fuel vapor at point A using a ratio of about 14.3 to 1 by weight, and then compressed. In the SI case, the combustion process is started by a spark which occurs near point B in the cycle. In the CI case, the combustion process is started when the fuel is either directly injected into the cylinder, or indirectly injected into a prechamber connected to the main cylinder. The superheated air initiates the combustion. In both cases, as the fuel burns, the pressure rises and work is done to push the piston downward. This is the expansion cycle, and it is represented on FIG. 2 as B-G-D-E. At the point E, the end of the expansion cycle, the exhaust valve opens and the remaining compressed exhaust gases are released with a resultant loss of energy during the exhaust stroke or phase. This process is sometimes termed "exhaust blow down." This lost energy is represented by the area E-F-A. Point A represents the termination of expulsion of exhaust gases from the engine, and the cycle is repeated.

Three models are used for the addition of heat to the compressed gas in internal combustion engines. The first is the Otto cycle, which is shown by A-B-C-D-E, and also known as a constant volume cycle. The second is the Diesel cycle, which is shown by A-B-D-E, and also known as a constant pressure cycle. The third is a limited-pressure cycle, which is not shown, and contains some constant volume expansion, followed by some constant pressure expansion. Another model, which is used in gas turbines, is the Brayton (Joule) cycle. This model consists of adiabatic compression, followed by constant pressure heat addition, followed by adiabatic expansion down to atmospheric pressure. This model best describes the present invention's operation.

Practical engines, both SI and CI, usually fail to reach maximum theoretical pressure represented by point C in the pressure-volume diagram of FIG. 2; instead, the maximum pressure is usually encountered at a point such as G on that diagram. CI engines typically reach higher pressures than SI engines, however. The area enclosed by these curves is the amount of energy available to do mechanical work. Highest temperatures and pressures will be encountered in the area B-G-D of the diagram, and it is at the high temperatures and pressures that nitrous oxides are formed.

It is an object of the present invention to provide an engine that will more closely follow the Brayton cycle, limiting the production of nitrous oxides. It is also an object of the present invention to utilize the energy in the area A-E-F as shown in FIG. 2 by employing full expansion of the exhaust gases. Other desirable operating characteristics will also be realized.

Three goals in engine design are efficiency (maximum work output for fuel consumed), high power output for engine size and weight (or specific output), and low pollution, especially hydrocarbons and nitrous oxides. Following is a summary of the characteristics of SI and CI engines.

Pollution

1. CI engines generate high nitrous oxides pollutants because of high temperatures and pressures in the presence of excess oxygen. Additionally, they generate smoke (carbon particles) because of incomplete combustion. Typically CI machines produce low hydrocarbon pollution.

2. Properly adjusted SI engines operating at temperature generate high hydrocarbon emissions because of quench. Quench occurs when combustion is prematurely extinguished near cool cylinder walls, leaving unburnt fuel and causing hydrocarbon pollution.

Efficiency

1. CI engines are superior because of higher compression ratios, and lack of pumping losses and excess air. Pumping losses are work done by the engine to suck air past a partly closed throttle. CI engines have no butterfly valve in the intake manifold to restrict air flow. CI engines are forced to use excess air because of incomplete combustion in the presence of sufficient air. The efficiency is higher because air is less prone to disassociation than exhaust gases. Molecular disassociation of carbon dioxide and water vapor at very high temperatures, which occurs when exothermic chemical reactions reverse, reabsorbing energy, are reduced by the present engine, giving a further efficiency advantage. Dissociation is more severe at higher temperatures.

As mentioned above, two types of CI engines are in common use, direct and indirect injection. The direct injection engines inject the fuel spray directly into an open chamber. Indirect injection engines direct the fuel into a smaller connected prechamber where ignition begins. Direct injection engines are more fuel efficient due to lower air velocity during combustion and lower chamber wall area. High air velocity results in high heat transfer to the cylinder walls.

2. SI engines have inferior efficiency because of lower compression ratios. Compression ratios must be lower because of knock, or autoignition problems. Additionally, pumping losses mentioned above reduce efficiency further under partial throttle conditions.

SPECIFIC POWER OUTPUT

1. CI engines are inferior due to the problem of injected fuel encountering insufficient oxygen to react with before the pressure/temperature drops below the autoignition point. For this reason, much research has been done to produce fuel injection equipment which optimizes the mixing of fuel droplets with available oxygen. Because direct injection typically produces less effective fuel air mixing, direct injection engines are typically somewhat inferior to indirect injection engines as regards specific power output. The specific power output of CI engines can be increased by supercharging or turbocharging the incoming air. Turbocharging uses the exhaust blowdown energy to pump in more available air, increasing power.

2. SI engines produce high specific power output because all available oxygen is used. This is because the fuel and air are premixed. Supercharging or turbocharging is effective at increasing specific power output, but knock problems are aggravated.

Two cylinder CI and SI engines with an interconnecting chamber have been proposed in the past, but have not attained wide commercial success. Typically, they employ a valve in the passageway between the cylinders. The lack of a valve between cylinders is a distinguishing feature of the Holtzman engine.

The present invention uses approximately constant pressure expansion combustion to produce power with low pollution because of lower temperatures. Specific power output is increased since more oxygen is utilized in view of more effective and efficient air control. The engine features high efficiency because it employs high compression ratios, low air velocity resulting in low heat transfer to the chamber walls, full expansion of gases, and excess air, particularly at partial throttle.

SUMMARY OF THE INVENTION

Engines according to the present invention may be referred to as Holtzman engines. FIG. 1A through 1D are diagrams showing the pistons and valve movements required to implement the basic machine cycle. Referring to FIG. 1A, the assembly consists of a smaller compression piston 1 reciprocating in cylinder 2 with intake valve 7 being the sole valve in this cylinder. The compression piston 1 serves to draw in a charge of fresh air through the intake valve 7 and then to compress the air charge. Another larger expansion piston 3 reciprocates in larger cylinder 4 in close proximity to cylinder 2. The expansion piston 3 serves to allow expansion of and derive work from the combustion gases and to expel the spent combustion products through exhaust valve 8. The space above the two cylinders is interconnected by a continuously open tube or passageway 6. Fuel injector 10 sprays fuel into larger cylinder 4 or tube 6.

Operation is a follows:

A. INTAKE STROKE (FIG. 1A)—As piston 1 drops, intake valve 7 opens allowing fresh air into cylinder 2 above piston 1. While piston 1 is moving, piston 3 remains substantially in an up position, so that there is minimal airflow through tube 6.

B COMPRESSION STROKE (FIG. 1B)—Near the bottom of piston 1's travel, intake valve 7 closes and piston 1 starts upward. As piston 1 travels upward, the air temperature above piston 1, piston 3, and in tube 6, rises due to heating of the air caused by compression. While piston 1 is rising, piston 3 remains nearly stationary or rises slowly. There is never a large pressure difference between cylinders 2 or 4 because these volumes are always interconnected by open tube 6. When the air pressure and temperature are near the maximum and piston 1 is near the top of its travel, fuel is injected via the injector 10 which produces a spray of atomized fuel into larger cylinder 4 or near the end of tube 6. Fuel droplets are evenly mixed with fresh air because injector fuel flow is matched with air flow between cylinders. The timing and quantity of the fuel injection is adjusted to allow for ignition delay, and to match air flow which is affected by the combustion process.

C. EXPANSION STROKE (FIG. 1C)—Having arrived near the top of its stroke, compression piston 1 slows dramatically its ascent while expansion piston 3 begins its downward stroke. As piston 3 begins to move downward and piston 1 moves upward slowly, air moves through tube 6 from above piston 1. Fuel continues to be injected into the moving air stream, and the fuel burns soon after injection. The combustion may limit the pressure drop to a relatively small amount or the continued rise of piston 1 may cause the pressure to rise moderately as desired. Ignition will be assisted by residual hot recompressed exhaust gases from the previous cycle. As a starting aid, the fuel droplets can be allowed to hit a hot wire or glow plug. The expanding combustion gases prevent the drop of pressure until the fuel is consumed. After the fuel is completely burned, piston 2 continues downward until essentially all useful work is obtained from the gas, and the gas is essentially at or near atmospheric pressure. This engine limits the peak pressure in the chambers by controlled mixing of air and fuel. If pressure from combustion raises the pressure in cylinder 4 above the pressure in cylinder 2, the flow of air will be retarded and combustion will be slowed until piston 3 drops some more.

D. EXHAUST STROKE (FIG. 1D)—Near the bottom of expansion piston 3's travel, the exhaust valve 8 opens, and the piston begins its upward movement expelling exhaust gases. As it travels upward, piston 1 remains essentially stationary or rises slowly. At the end of the exhaust cycle, the exhaust valve closes and the intake valve opens to begin another intake cycle. Some hot exhaust products will be left behind in combustion chamber 4 to assist ignition on the next cycle. Some valve overlap can be tolerated and will be beneficial to heat the open tube 6.

Another object of the invention is to provide an engine with higher thermal efficiency and lower air pollution than conventional CI or SI (spark ignition) engines. Higher thermal efficiency results from full expansion of combustion gases. Full expansion of the exhaust gases occurs because the expansion piston displaces a larger volume than the compression piston. Another contributor to higher efficiency is lower mechanical work required for air compression in a cooler compression chamber 2. The compression chamber will operate cooler because combustion does not take place there. A further reason for increased thermal efficiency is less heat loss in a hotter expansion chamber. The expansion chamber will be more efficient because of lower heat transfer due to modest air turbulence, minimal surface area, and high operating surface temperatures. Efficiency is also high due to the high compression ratios characteristic of open chamber CI engines, typically 13-22:1.

Engines of the present invention create less air pollution, compared to conventional CI engines, due to lower peak pressure and temperature in combustion. This reduces the formation of nitrous oxides (NOx's). Hydrocarbon emissions are low compared to SI engines because of lack of quench problems, which is characteristic of CI engines.

Another object of the invention is to provide engines that require no new metallurgical technology for construction. Although use of heat resistant materials such as ceramics in the expansion chamber and open tube will raise efficiency even higher, new technology is not required.

Another object of the present invention is to produce engines with high specific power output relative to size or weight. High specific power is achieved because of excellent fuel and air mixing due to the injection of fuel into a stream of moving air. Such injection allows more oxygen to be used in the combustion process, thereby generating more power before the smoke limit is reached. The smoke limit is the maximum amount of fuel that can be injected before exhaust smoke becomes unacceptable. Smoke limit limits maximum power in CI engines.

Another object of the present invention is to produce an engine that is lighter in weight than comparable performance existing CI engines. Lower peak pressures allow engine parts to be lighter in weight with resulting lower vibration, lower cost, and higher power output to weight ratio.

Other objects, features and advantages are inherent in and/or apparent with reference to the remainder of this document.

BRIEF DESCRIPTION OF THE DRAWINGS

FIG. 1A is a schematic diagram showing piston movement and valve position of an engine according to the present invention on the intake stroke.

FIG. 1B is a schematic diagram showing piston movement and valve position of the engine of FIG. 1A on the compression stroke.

FIG. 1C is a schematic diagram showing piston movement and valve position of the engine of FIG. 1A on the expansion stroke.

FIG. 1D is a schematic diagram showing piston movement and valve position of the engine of FIG. 1A on the exhaust stroke.

FIG. 2 is a pressure-volume diagram showing energy per cycle and differences between the Diesel cycle, Otto cycle, and practical engines.

FIG. 3A is a side elevational schematic view of a four bar mechanism with dwell that produces piston movements according to the present invention.

FIG. 3B is a front elevational view of the mechanism of FIG. 3A, featuring the expansion piston assembly.

FIG. 3C is a front elevational view of the mechanism of FIG. 3A, featuring the compression piston assembly.

FIG. 6A shows a side view of a gear driven mechanism according to the present invention that produces the desired piston movements.

FIG. 6B is a partial cross sectional, partial front elevational view of the mechanism of FIG. 6A.

FIG. 7A shows a cam-driven mechanism according to the present invention that produces the desired piston movements.

FIG. 7B is a bottom plan view of the mechanism of FIG. 7A.

FIG. 7C is a side view of the cam plate of FIG. 7A.

DETAILED DESCRIPTION OF THE DRAWINGS

Figure 4A:
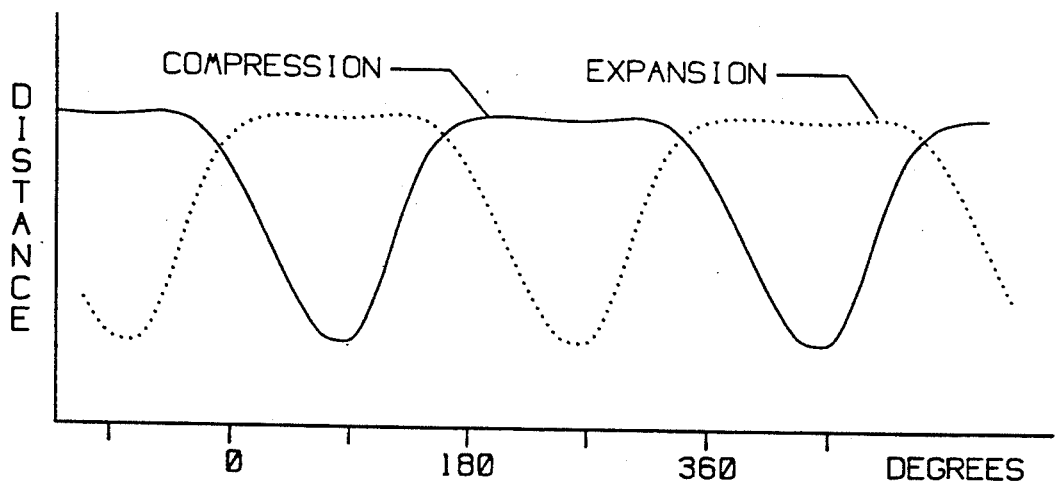
FIG. 4A is a position vs. time diagram showing the piston position as a function of time for the embodiment of FIG. 3A.

FIG. 2 is a pressure-volume diagram which illustrates the pressure and volume of a charge of air as it passes through engines. According to the present invention, the air is drawn into the compression cylinder or chamber at point A and is adiabatically (without heat transfer) compressed to point B. At point B the volume is the original volume divided by the compression ratio. For the Holtzman engine the compression ratio is the total volume with compression piston 1 (FIG. 1) in the up position and the expansion piston 3 in the up position divided by the total volume with piston 1 in the down position and piston 3 in the up position. If heat is added at constant volume, the pressure rises to point C. This is the Otto cycle. If heat is added at constant pressure, the heat addition would occur as the volume expanded from point B to point D. From either point C or D, adiabatic expansion occurs down to the original volume at point E. The work output per cycle is represented by the area of the curves bounded by A-B-C-D-E for the Otto cycle or A-B-D-E for the diesel cycle. If the expansion process were allowed to continue down to atmospheric pressure from point E, the point F would be reached. This is accomplished in the Holtzman engine by the larger expansion volume. The area A-E-F represents the recovered work output available from the present invention by full expansion. The process of constant pressure addition of heat followed by complete expansion of the gases to atmospheric pressure is described as a Brayton cycle, although this description is most often associated with a gas turbine. The formation of nitrous oxides that occurs at very high temperatures and pressures in the area of B-C-D of the curve is avoided by this invention. If the Holtzman engine is at partial throttle or idling, less heat (fuel) will be added, and the diagram will follow the dotted line downward, giving a diagram path of A-B-D'-E'-F'. This indicates that atmospheric pressure will be reached at a lower total volume. A means therefore may be provided with the Holtzman engine to prevent the creation of vacuum in the chambers under this condition.

FIGS. 3A-3C schematically show a first embodiment of a mechanism for achieving piston movement according to the present invention. FIG. 3A is a side elevational schematic view of the engine. FIG. 3B is a front elevational view of the expansion piston and its crank assembly. FIG. 3C is a front elevational view of the compression piston and its crank assembly. The assemblies in FIGS. 3B and 3C are similar, and corresponding item numbers have been noted by a C (compression) or E (expansion) suffix. This implementation is known as a dwell mechanism on a 4-bar linkage. The assembly consists of crank 11 rotating (preferably but not necessarily) counter-clockwise around point 5, and three rods or links which have pivot points on each end. The crankshaft 11 pushes and pulls on the connecting rod 12, which connects from the crankshaft 11 at point 16 to the triple pivot point 17. The piston is connected by piston rod 14 to the triple point 17. The rocker rod 13 connects the triple point 17 to the anchor pivot 15, which may be a shaft, a protrusion from the engine casing, or as otherwise desired. These parts together form a power transfer unit.

The power transfer unit shown in FIG. 3C drives compression piston 1 which is shown near the bottom of its travel. The power transfer unit in FIG. 3B is driven by the expansion piston 3, which is shown near its top most position. Note that the right and left assemblies are similar, except they are approximately ½ rotation, or 180 degrees, separated.

Cams for opening and closing valves 7 and 8 are not shown, but can be located on crankshaft 11 resulting in the elimination of a separate camshaft. This is because a full cycle occurs in one revolution of the crankshaft. Alternatively, an overhead cam shaft, rotating at crankshaft speed, may be used, as may be any other desired means. Valve operation is as shown in FIG. 1.

Figure 5:
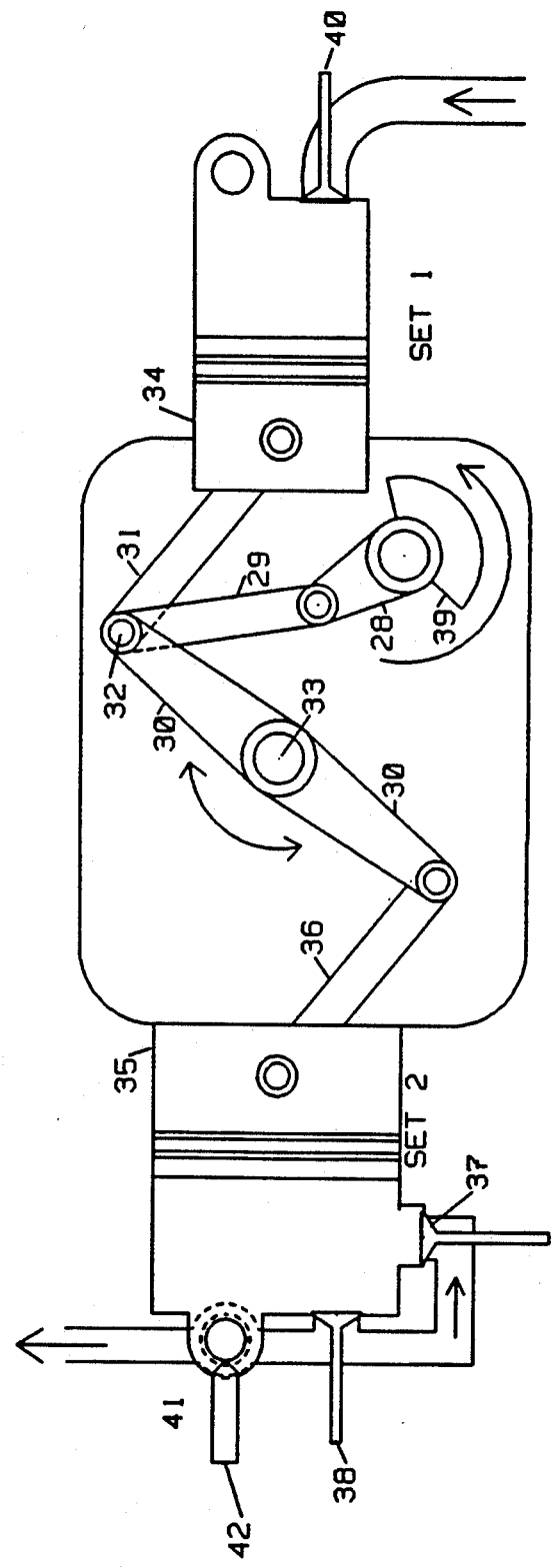
FIG. 5 is a side elevational schematic view of a modified four bar mechanism according to the present invention that produces improved balance by implementing two pairs of cooperating cylinders.

As shown in FIG. 3, a fuel injector 10 may be used to insert fuel into passageway 6; alternatively, the fuel injector may be positioned to inject fuel into the expansion cylinder as shown, for instance, in FIGS. 1 or 5. Additionally, a spark plug may be used in connection with the fuel injector in order to stratify the charge for increased efficiency. A further variation is use of the "Texaco Combustion Process" as disclosed in E. Obert, *The Internal Combustion Engine and Air Pollution*, which is incorporated herein by this reference. According to that process, air is turbulently injected into the expansion cylinder 4 from passageway 6, fuel is directly injected into the cylinder, and a spark plug downstream ignites the fuel. Here, the fuel injector 10 may just as easily inject the fuel into the passageway 6, in order to take advantage of the turbulence imparted to the air flowing through the passageway as it exits into the cylinder. Although specific output may be lower than other cases from incomplete use of air in the cylinder, resulting operational advantages may justify TCP techniques, particularly for low power levels.

Another technique that may be employed is to load the passageway with catalytic material downstream of the fuel injector. The catalyst materials, such as used in a catalytic converter of a conventional exhaust system, will aid rapid and complete combustion with resulting high efficiency and low pollution.

Figure 4B:
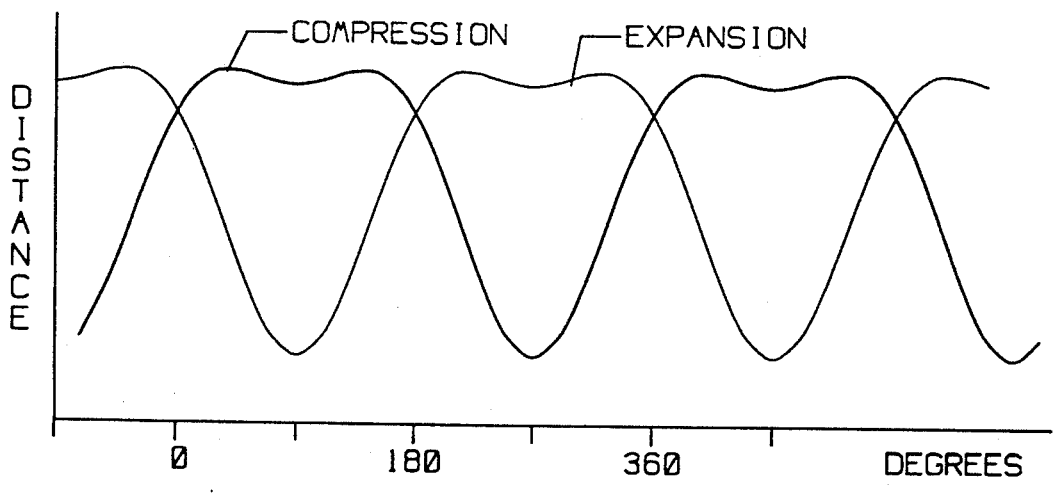
FIG. 4B is a position vs. time diagram showing the piston position as a function of time for the embodiment in FIG. 6.
Figure 4C:
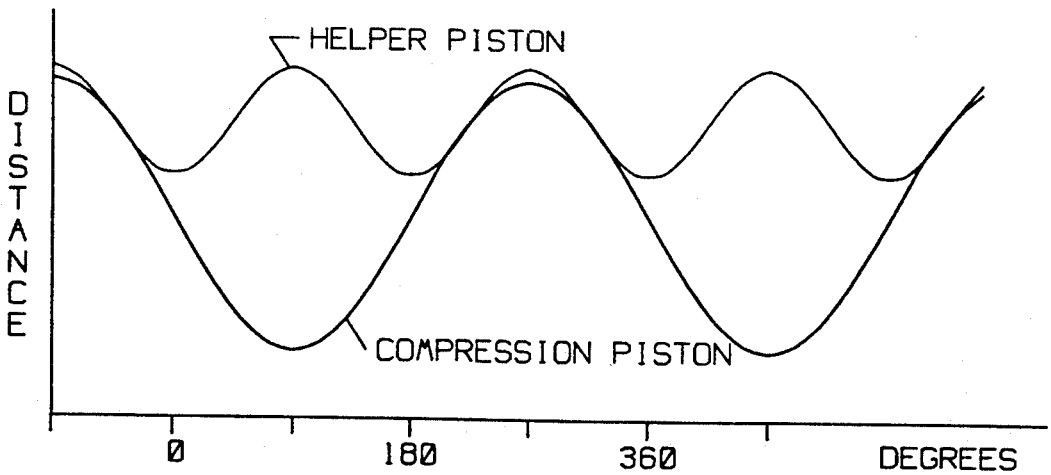
FIG. 4C is a position vs. time diagram showing the piston position as a function of time for the embodiment in FIG. 8.

FIG. 4A is a position vs. time diagram showing piston positions as a function of time for the embodiment of the invention shown in FIG. 3A. (FIGS. 4B and 4C are corresponding position-time diagrams for embodiments shown in subsequent figures.) The thinner line represents the vertical height of the compression piston, and the thicker line represents the height of the expansion piston. Depending on desired compression ratios, the crank pins, 16C and 16E, may be separated by less than 180 degrees. Note that rate of rise of the pistons need not be equal to the rate of fall. This can be used to advantage when designing an engine to allow more time for complete combustion.

FIG. 5 is a side elevational schematic view of a modified four bar mechanism according to the present invention. This mechanism employs two pairs of cooperating cylinders to allow better balancing of the moving parts in order to reduce vibration. Only the front two pistons of the four are shown, for clarity. The other two are located behind the two shown. The two shown are the intake/compression piston 34 of cylinder set 1 on the right and the power/exhaust piston 35 of set 2 on the left. The crankshaft 28 rotates (preferably but not necessarily) in a counterclockwise direction and the cranking action causes it to push and pull on the connecting rod 29. The connecting rod connects at point 32 to the piston rod 31 and rocker rod 30. The piston rod causes the intake/compression piston 34 from set 1 to reciprocate. The rocker rod 30 pivots around pivot point 33 and the opposite side of the rocker rod 30 also functions as the rocker rod for the compression/expansion piston 35 in set 2. The pistons can be constructed to weigh approximately the same and reciprocate in opposite directions for optimum balance. Counterweight 39 can be employed, if desired, to better balance the crankshaft 28 and connecting rod 29. The cams to provide lift for the poppet valves 38 and 40 can be of the overhead type and driven by a belt or chain; they can be located on the crankshaft 28 and use push rods, or they can be positioned and formed as otherwise desired. In either case, the cam will rotate (preferably) once per crankshaft rotation.

Another feature shown in FIG. 5 is the use of an idle bypass valve 37. While the engine is running at low power or is idling, insufficient exhaust gases may be available to push the piston 35 all the way down. This situation corresponds to point F' in FIG. 2. At least four solutions can prevent lost energy caused by expansion piston 35 creating a vacuum. The first is to open the exhaust valve 38 by mechanical means before the piston 35 reaches the bottom of its cycle. The second is to install a one way valve 37 which will sense the low pressure and relieve the partial vacuum that is forming in the cylinder. The third is to employ a simple on-off valve on the side of the cylinder wall that may be closed for non-idle or high power operation. Closure can occur manually or with an actuator. Locating the valve 37 on the side of the cylinder wall keeps it from being exposed to high pressure and temperatures present at the top of the cylinder. This valve may be of the poppet type, as illustrated, with a weak spring to close it; it may alternatively be a reed or any other type. The fourth solution is to make the compression and expansion pistons the same size, but hold the intake valve open for part of the compression cycle, reducing the change of air in the compression cylinder. If the valve timing is made adjustable, easier starting characteristics and higher power output can be selected over more efficient operation.

Another feature which ma be employed in embodiments such as the one shown in FIG. 5 and others is a heat exchanger to transfer thermal energy from the hot exhaust gases in the exhaust manifold to the open tube 41. The heat supplied to the outside of the open tube from the exhaust gases will pre-expand the compressed air as it passes through the open tube, thereby increasing the efficiency of the engine. Heating of the air in the open tube will also improve compression ignition. This feature is obviously useful if the temperature in the exhaust gas is above the temperature of the tube. Another way to heat the open tube is from the inside. This is done by closing the exhaust valve early, pushing some hot exhaust gases into the tube. Compression heats the exhaust gas further, resulting in greater heat transfer to the tube. The utility of this advantage depends on the design and temperatures of the individual engine.

Another crank assembly is shown in FIGS. 6A and 6B. FIG. 6A is a side sectional schematic view of an engine according to the present invention showing a gear driven mechanism that produces the desired piston movements. The compression piston 4 is shown on the left and the expansion piston 44 is on the right. Except for piston size and the fact that the pistons are phased at 180 degrees of rotation (or as otherwise desired), the compression and expansion assemblies are similar. FIG. 6B is a view through section AA of FIG. 6A, which is a cross section through the compression connecting rod 50. The crank mechanism consists of two gears, large gear ring 45 with inside teeth, and small planetary gear 46 with outside teeth. Gear ring 45 is fixed in position with respect to the engine. Planetary gear 46 rotates around the crankpin 49 which is a portion of the crankshaft 47. Gears 45 and 46 are thus meshed by crankshaft 47 which rotates around pivot point 48, which point is also the center of gear ring 45. Planetary gear 46 has one half as many teeth as gear ring 45 and rotates inside gear ring 45. As the crankshaft 47 rotates counterclockwise about pivot point 48, planetary gear 46 is forced to rotate clockwise about crankpin 49. Planetary gear 46 rotates at twice the rotational speed (angular velocity) of crank 47. Attached integrally to planetary gear 46 in eccentric fashion is the offset bearing 53. The planetary gear 46 and offset bearing together are shown as the hatched are in FIG. 6A. Connecting rod 50 is connected from piston wrist pin 51 to offset bearing 53, and is driven by the offset bearing. As planetary gear 46 rotates, offset bearing center point 52 traces a roughly triangular locii of points. This structure imparts upon the piston 43 connected to wrist pin 51 the required motion of pausing (dwell) for approximately half of a rotation of the crank.

FIG. 4B is a diagram showing as a thin line the height of compression piston 43 as a function of crankshaft rotation for the embodiment shown in FIGS. 6A and 6B. The height of expansion piston 44 is shown as a thicker line 180 degrees out of phase with compression piston 43. As mentioned above, any phase relationship may be incorporated as desired.

FIG. 7A-7C show another embodiment of the present invention, in which a two-piston assembly is driven by a concavo-convex member or cam plate or wobble plate. Only the pistons and the mechanism that drives the pistons are shown, and those schematically, but the remainder of the engine is similar to the embodiment shown in FIG. 3A. FIG. 7B is a view of the assembly from the bottom. FIG. 7A is a side view of the assembly. FIG. 7C is a side view of the mechanism shown in FIG. 7A, showing only the cam plate 88 on rotating drum 91 and the output shaft 90. Piston 80 is a compression piston shown in the down position, and piston 81 is an expansion piston shown in the up position. Compression piston 80 has rigidly fixed to it a rod 82, and expansion piston 81 has rod 83 fixed rigidly to it. The rods are rigidly connected on one end to the pistons, and on the other end connected to the engine housing, which is not illustrated, in sliding fashion. Both rods 82 and 83 have dual roller assemblies, 84–87, connected to their sides that engage and ride on both sides of the cam plate 88. Cam plate 88, which is not flat, is fixed to the rotating drum 91 which in turn is connected to output shaft 90, which rotates about point 89. As the cam plate rotates, the rollers remain continuously engaged with it, and the cam plate lifts the rollers, rods, and pistons. The shape of the cam plate is controlled to provide the required motion of the 2 pistons to implement the Holtzman cycle, that is, a down-up motion for about a half rotation, and dwell for approximately the other half. The rollers are shown in the drawing as -180 degrees separated on the cam plate, but the angle may be modified as desired to meet the requirements of a particular design.

Figure 8A:
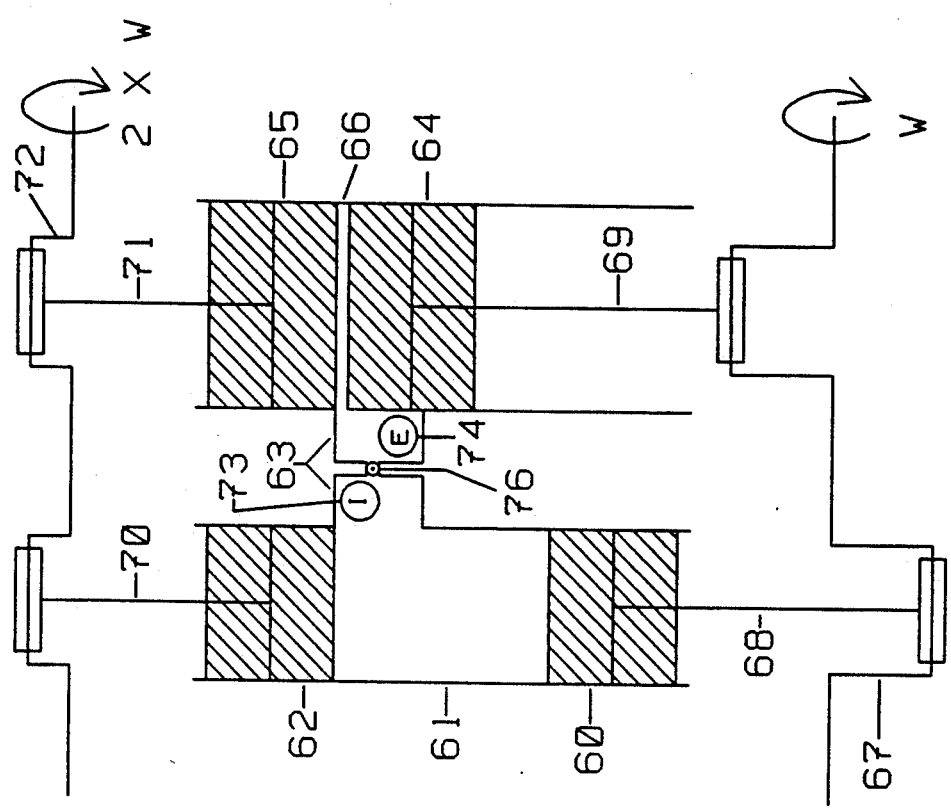
FIG. 8A shows a 2-crankshaft, 4-piston mechanism that produces desired volume changes using helper pistons.
Figure 8B:
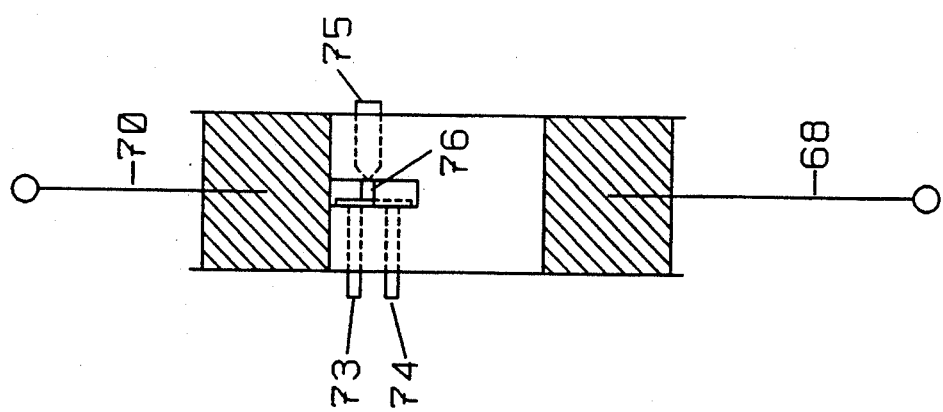
FIG. 8B is a side cross sectional view of the compression cylinder of FIG. 8A.

FIG. 8 is a diagram of a device for implementing the required volume changes on the compression and expansion sides using a conventional crank mechanism and using helper pistons. Compression piston 60 reciprocates in cylinder 61, and is driven by power crankshaft 67 through connecting rod 68. Also reciprocating in cylinder 61 is helper compression piston 62, which is driven by helper crankshaft 72 through rod 70. Helper crankshaft 72 is geared to power crankshaft 67 and rotates at twice its angular velocity. The gear or chain mechanism is not shown. The expansion cylinder has a corresponding expansion piston 64 which moves (preferably but not necessarily) 180 degrees out of phase with piston 60, and a corresponding helper piston 65 that moves in phase (zero degrees) with helper piston 62. The phase between piston positions is controlled by the respective crankshafts. An interconnecting chamber 63 or tube connects the volumes between pistons 60 and 62 with the volume between pistons 64 and 65. The interconnecting chamber is also used to locate intake valve 73 and exhaust valve 74. A relatively small are opening 76 between chambers is used to funnel the air moving between sides, so that injector 75 can direct the fuel spray into the air stream. FIG. 4C shows the relative positions of pistons 60 and 62 in cylinder as a function of crankshaft angle for this mechanism. The difference between curves represents the distance between pistons, and hence the volume between the pistons. For 0–180 degrees the two pistons pull apart and then back together again. For 180–360 degrees the pistons remain close to each other. Even though both pistons are moving, their relative motion is nearly the same. For this embodiment, the cam to lift the intake and exhaust valves may be geared to the crankshaft 67.

It must be recognized that the expansion of the air is caused by the combustion of fuel in the air, which adds heat plus combustion products to the air. In accordance with the intention of the present invention, the air (or other gas) can also be expanded by adding heat to the air by thermal conduction and/or forced convection. This can be accomplished by passing the air through the open tube, which has been modified to increase its surface area, and heated by external means. As the air is passed through the tube, it expands as it picks up heat from the tube, thereby cooling the tube. The tube is still open, but its inside geometry has been optimized for the maximum surface area relative to the volume of gas in the tube. Accordingly, this is the external combustion implementation of the Holtzman engine. The external added heat may be from any source, such as the external combustion of fuel, the focusing of sunlight, or a nuclear reactor. The term external combustion is used to generally denote heat added externally.

Figures 9A, 9B:
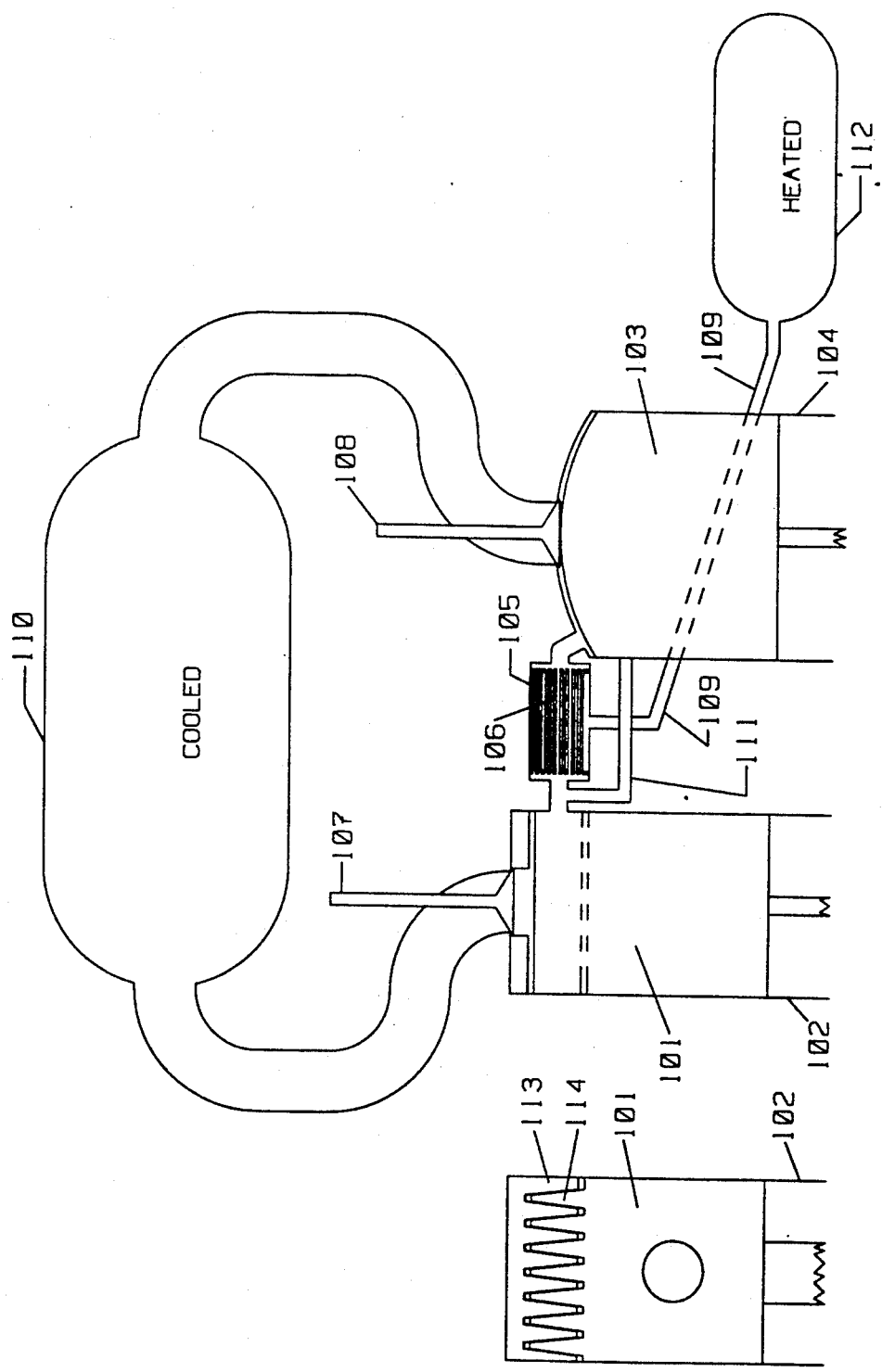
FIG. 9A is a view of an implementation of the Holtzman engine that can be implemented using heat transfer through multiple open tubes from an external source of heat, rather than internal combustion.
FIG. 9B is a view of an alternative arrangement of a portion of the engine of FIG. 9A.

FIG. 9A shows a side view of an external combustion engine. FIG. 9B is a front view of the engine with detail shown on the compression piston. Only the pistons and part of the piston rods are shown. The compression piston 101 reciprocates in cylinder 102 and the expansion piston 103 reciprocates in cylinder 104. The motion of both pistons and valves 107 and 108 is similar to that described in FIG. 1. There are several refinements that optimize the external combustion engine. The heat exchanger 105 is of the shell and tube type and contains several open tubes 106 connected in parallel. As gas passes through the insides of open tubes 106, it is heated and expands. The heat is applied to the outside of the open tubes by a heat pipe structure. A liquid, such as molten sodium, is heated to a vapor state in boiler 112, travels through tube 109, and the vapor is condensed on the outside of tubes 106. Because of metallurgical limits, the temperature of open tubes 106 must be limited. To increase specific power output, and improve heat transfer, a different gas than air may be employed as the working fluid. Helium or hydrogen may be used because their thermal conductivity is greater (lighter molecules travel at greater velocity), and the cycle may be operated at elevated minimum pressure. These changes require a closed system whereby the working gas is pressurized and reused. This is accomplished by cooling the exhaust gas in cooling reservoir 110 and passing it back into the compression cylinder. The volume of the cooling reservoir is large to effect cooling and to buffer pressure fluctuations. Typically the crankcase and undersides of the pistons are also under pressure to reduce piston loading due to pressure differential.

Two other refinements may be used as desired. One is cooling fins 114 on the compression piston 101 that match up with cooling fins 113 in the head of the compression cylinder. The cooling fins allow the compression process A-B in FIG. 2 to become more isothermal instead of adiabatic. Point B will be thus shifted to the left of its present location, which means the compression ratio is increased. This cooling of the gas while compressing allows easier (less work) compression and more heat energy to be put into the expansion cycle, with only slight decrease of efficiency. This modification would be unworkable on the compression ignition internal combustion version because the cooled gas would not start combustion. The other refinement is the optional bypass tube 111 which is uncovered when the exhaust piston descends part way down. This bypass tube is unheated and shunts the heated tubes 106. This reduces the heat being transferred at low pressure in the cycle, increasing efficiency. Referring to FIG. 2, most heat is added from B to D and only a small amount of heat is added to D and F. The use of a heat pipe (105, 106, 109, and 112), working gases other than air, a closed pressurized cycle, a bypass tube 111, and isothermal compression are all practical refinements that may be employed as desired by the designer, and are not intended to restrict the scope of the invention.

In the present state of the art of designing internal combustion engines, various design techniques are well known, and are also applicable to the design of the Holtzman engine. Among these techniques which may be applied to devices of the present invention are the following:

1. There may be more than one valve per cylinder. If an additional intake valve is used, more intake air will be allowed into the cylinder, increasing the volumetric efficiency. If an additional exhaust valve is used, less work will be required to push out the exhaust gases.

2. There may be a plurality of tubes or chambers between cylinders. This technique would be particularly useful if multiple injectors were used, as is common practice on large engines. This technique would also be useful if a heat exchanger is used to transfer exhaust heat into the air passing through the open tube.

3. A wide variety of fuels may be used.

4. The engine may be supercharged or turbocharged. This technique raises the specific power output, as it does on conventional engines.

5. A plurality of cylinder pairs may be used, and they may be arranged in a wide variety of geometries, including, but not limited to horizontally opposed, V-shaped, in-line, X-shaped, and H-shaped.

6. Exhaust gas may be injected into the intake air for further reduction of nitrous oxide formation.

7. Better engine balancing can be achieved by the use of additional shafts, rotating at harmonic rates, with offset weights to cancel the vibration of the basic mechanism.

8. Construction materials for the engines may include, but are not limited to, materials such as metals, ceramics, plastics, and composites.

9. Cooling may be accomplished with air, or liquid, or the engines may be operated adiabatically (with no external cooling).

10. Variable or adjustable valve timing may be employed. This will allow the air charge to be reduced for full expansion of exhaust gases when the compression and expansion pistons are the same size. Alternatively, the air charge may be increased to facilitate starting or increase power output.

11. The lengths and connecting points of the connecting rod, rocker rod, piston rod, and crank arm may be varied to produce the desired motions of compression and expansion pistons.

12. A catalyst material may be positioned in the path of the fuel-air mixture to assist the start, speed and thoroughness of combustion.

The foregoing is presented for purposes of explanation and illustration of a preferred embodiment of the invention. Modifications, adaptations and derivations may be made to the disclosed embodiments without departing from the scope or spirit of the invention.

What is claimed is:

1. An internal combustion engine comprising at least one conversion unit which includes:
   (a) a compression cylinder;
   (b) an expansion cylinder separate from the compression cylinder;
   (c) a passageway connecting the compression cylinder with the expansion cylinder;
   (d) a compression piston disposed in the compression cylinder in a sliding relationship;
   (e) an expansion piston disposed in the expansion cylinder in a sliding relationship;
   (f) a crank; and
   (h) means for coupling the compression and expansion pistons to the crank such that the compression piston remains substantially stationary at substantially top dead center during a substantial portion of the stroke of the expansion piston, and the expansion piston remains substantially stationary at substantially top dead center during a substantial portion of the stroke of the compression piston.

2. An engine according to claim 1 comprising a plurality of conversion units.

3. An engine according to claim 1 in which the distance travelled by the compression piston in the compression cylinder is substantially equal to the distance travelled by the expansion piston in the expansion cylinder.

4. An engine according to claim 1 in which the distance travelled by the compression piston in the compression cylinder is not equal to the distance travelled by the expansion piston in the expansion cylinder.

5. An engine according to claim 1 in which the compression cylinder cross sectional area is substantially equal to the expansion cylinder cross sectional area.

6. An engine according to claim 1 in which the compression cylinder cross sectional area is not equal to the expansion cylinder cross sectional area.

7. An engine according to claim 1 further comprising, for each conversion unit, an intake valve communicating with the compression cylinder and an exhaust valve communicating with the expansion cylinder.

8. An engine according to claim 1 further comprising, for each conversion unit, a fuel injector disposed partially in the passageway.

9. An engine according to claim 1 further comprising, for each conversion unit, a fuel injector disposed partially in the expansion cylinder.

10. An engine according to claim 9 further comprising, for each conversion unit, a spark plug disposed downstream of the fuel injector.

11. An engine according to claim 8 further comprising, for each conversion unit, catalytic material downstream of the fuel injector.

12. An internal combustion engine comprising at least one conversion unit which includes:
  (a) a compression cylinder;
  (b) an expansion cylinder separate from the compression cylinder;
  (c) a passageway connecting the compression cylinder with the expansion cylinder;
  (d) a compression piston disposed in the compression cylinder in a sliding relationship;
  (e) a compression four-bar linkage comprising:
    (1) a piston rod pivotally connected to the compression piston and rocker and connector rods;
    (2) the rocker rod pivotally connected to the piston and connector rods and to a point fixed with respect to the engine;
    (3) the connector rod pivotally connected to the piston and rocker rods and a crank portion; and
    (4) the crank portion pivotally connected to the connector rod;
  (f) an expansion piston disposed in the expansion cylinder in a sliding relationship; and
  (g) an expansion four-bar linkage comprising:
    (1) a piston rod pivotally connected to the expansion piston and rocker and connector rods;
    (2) the rocker rod of the expansion linkage pivotally connected to the piston and connector rods of the expansion linkage and to a point fixed with respect to the engine;
    (3) the connector rod of the expansion linkage pivotally connected to the piston and rocker rods of the expansion linkage and a crank portion; and
    (4) the crank portion of the expansion linkage pivotally connected to the connector rod of the expansion linkage.

13. An engine according to claim 12 comprising a plurality of conversion units.

14. An engine according to claim 12 in which the crank portion for the compression linkage and the crank portion for the expansion linkage are formed on a common crank.

15. An engine according to claim 12 in which the distance travelled by the compression piston in the compression cylinder is substantially equal to the distance travelled by the expansion piston in the expansion cylinder.

16. An engine according to claim 12 in which the distance travelled by the compression piston in the compression cylinder is not equal to the distance travelled by the expansion piston in the expansion cylinder.

17. An engine according to claim 12 in which the compression cylinder cross sectional area is substantially equal to the expansion cylinder cross sectional area.

18. An engine according to claim 12 in which the compression cylinder cross sectional area is not equal to the expansion cylinder cross sectional area.

19. An engine according to claim 14 in which the point at which the compression linkage connector is connected to the crank is located on the crank at approximately 180 degrees from the point at which the expansion linkage connector is connected to the crank.

20. An engine according to claim 14 in which the point at which the compression linkage connector is connected to the crank is located on the crank at an angle noticeably different from 180 degrees from the point at which the expansion linkage connector is connected to the crank.

21. An engine according to claim 12 further comprising, for each conversion unit, an intake valve communicating with the compression cylinder and an expansion valve communicating with the expansion cylinder.

22. An engine according to claim 12 further comprising, for each conversion unit, a fuel injector disposed partially in the passageway.

23. An engine according to claim 12 further comprising, for each conversion unit, a fuel injector disposed partially in the expansion cylinder.

24. An engine according to claim 21 further comprising, for each conversion unit, a spark plug disposed downstream of the fuel injector.

25. An internal combustion engine, comprising:
  (a) at least one pair of conversion units, each conversion unit comprising:
    (1) a compression cylinder;
    (2) an expansion cylinder separate from the compression cylinder;
    (3) a passageway connecting the compression cylinder with the expansion cylinder;
    (4) a compression piston disposed in the compression cylinder in a sliding relationship;
    (5) a piston rod pivotally connected to the compression piston;
    (6) an expansion piston disposed in the expansion cylinder in a sliding relationship;
    (7) a piston rod pivotally connected to the expansion piston;
  (b) for each pair of conversion units, a compression rocker rod pivotally connected to the compression piston rods and pivotally connected to a point fixed with respect to the engine;
  (c) for each pair of conversion units, an expansion rocker rod pivotally connected to the expansion piston rods and pivotally connected to a point fixed with respect to the engine;

(d) for each pair of conversion units, a compression connector rod pivotally connected to the compression rocker rod and to a crank;

(e) for each pair of conversion units, an expansion connector rod pivotally connected to the expansion rocker rod and to the crank.

26. An engine according to claim 25 in which the distance travelled by the compression piston in the compression cylinder is not equal to the distance travelled by the expansion piston in the expansion cylinder.

27. An engine according to claim 25 in which the compression cylinder cross sectional area is not equal to the expansion cylinder cross sectional area.

28. An engine according to claim 25 in which the point at which the compression linkage connector, for each conversion unit pair, is connected to the crank is located on the crank at approximately 180 degrees from the point at which the expansion linkage connector is connected to the crank for that conversion unit pair.

29. An engine according to claim 12 in which the compression cylinder cross sectional area is not equal to the expansion cylinder cross sectional area.

30. An internal combustion engine comprising at least one conversion unit which includes:

(a) a compression cylinder;

(b) an expansion cylinder separate from the compression cylinder;

(c) a passageway connecting the compression cylinder with the expansion cylinder;

(d) a compression piston disposed in the compression cylinder in a sliding relationship;

(e) a compression power transfer unit comprising:
  (1) a piston rod pivotally connected to the compression piston;
  (2) a planetary gear connected eccentrically and pivotally to the piston rod;
  (3) a crank connected pivotally to substantially the center of the planetary gear;
  (4) a gear ring fixed with respect to the engine, which meshes with the planetary gear in order to control rotation of the planetary gear as the crank rotates, and thus to control the motion of the piston rod connected eccentrically to the planetary gear;

(f) an expansion piston disposed in the expansion cylinder in a sliding relationship; and (g) an expansion power transfer unit comprising:
  (1) a piston rod pivotally connected to the expansion piston;
  (2) a planetary gear connected eccentrically and pivotally to the piston rod of the expansion piston and whose center is connected pivotally to a crank; and
  (3) a gear ring fixed with respect to the engine, which meshes with the planetary gear of the expansion power unit in order to control rotation of the planetary gear of the expansion power unit as the crank of the expansion power unit rotates, and thus to control the motion of the piston rod of the expansion power unit connected eccentrically to the planetary gear of the expansion power unit.

31. An engine according to claim 30 in which the distance travelled by the compression piston in the compression cylinder is not equal to the distance travelled by the expansion piston in the expansion cylinder.

32. An engine according to claim 30 in which the compression cylinder cross sectional area is not equal to the expansion cylinder cross sectional area.

33. An engine according to claim 30 in which the point at which the compression planetary gear is connected to the crank is located on the crank at approximately 180 degrees from the point at which the expansion planetary gear is connected to the crank.

34. An engine according to claim 14 in which the point at which the compression linkage connector is connected to the crank is located on the crank at approximately 180 degrees from the point at which the expansion linkage connector is connected to the crank.

35. An internal combustion engine comprising at least one conversion unit which includes:

(a) a compression cylinder;

(b) an expansion cylinder separate from the compression cylinder;

(c) a passageway connecting the compression cylinder with the expansion cylinder;

(d) a compression piston disposed in the compression cylinder in a sliding relationship;

(e) a compression power transfer unit comprising:
  (1) a piston rod rigidly connected to the compression piston;
  (2) a three dimensional generally concavo-convex cammed member connected to a location on the piston rod in a sliding relationship;
  (3) a rotating cylinder attached to the cammed member;

(f) an expansion piston disposed in the expansion cylinder in a sliding relationship; and (g) an expansion power transfer unit comprising:
  (1) a piston rod rigidly connected to the compression piston and having a location connected to the cammed member in a sliding relationship such that as the expansion piston moves in the expansion cylinder, the piston rod of the exp. piston bears on the cammed member to cause the crank to rotate.

36. An internal combustion engine comprising at least one conversion unit which includes:

(a) a compression cylinder;

(b) an expansion cylinder separate from the compression cylinder;

(c) a passageway connecting the compression cylinder with the expansion cylinder;

(d) a compression piston disposed in the compression cylinder in a sliding relationship;

(e) a compression piston rod pivotally connected to the compression piston;

(f) a power crank pivotally connected to the compression piston rod;

(g) a compression helper piston disposed in the compression cylinder;

(h) a compression helper piston rod pivotally connected to the helper piston;

(i) a helper crank pivotally connected to the compression helper piston rod;

(j) means connecting the power crank to the helper crank so that the helper crank features twice the angular velocity as the power crank;

(k) an expansion piston disposed in the expansion cylinder in a sliding relationship;

(l) an expansion piston rod pivotally connected to the expansion piston and to the power crank;

(m) an expansion helper piston disposed in the expansion cylinder; and (n) an expansion helper piston rod pivotally connected to the expansion piston and to the helper crank.

37. An engine according to claim 36 in which the total distance travelled by the pistons in the compression cylinder is not equal to the total distance travelled by the pistons in the expansion cylinder.

38. An engine according to claim 36 in which the compression cylinder cross sectional area is not equal to the expansion cylinder cross sectional area.

39. An engine according to claim 1 in which the working gas is heated by convection from passageway as the gas passes through the passageway.

* * * * *

UNITED STATES PATENT AND TRADEMARK OFFICE
CERTIFICATE OF CORRECTION

PATENT NO. : 5,228,415
DATED : July 20, 1993
INVENTOR(S) : Thomas H. Williams

It is certified that error appears in the above-identified patent and that said Letters Patent is hereby corrected as shown below:

Column 3, line 63, insert a period after --B--

Column 8, line 57, delete the word "change" and insert --charge-- therefor

Column 8, line 62, delete the word "ma" and insert --may-- therefor

Column 9, line 15, delete "4" and insert --43-- therefor

Column 9, line 38, delete the word "are" and insert --area-- therefor

Column 10, line 38, delete the word "are" and insert --area-- therefor

Column 12, line 61, delete "(h)" and insert --(g)-- therefor

Column 14, line 36, delete the word "expansion" and insert --exhaust-- therefor

Column 16, lines 34 and 35, delete the word "compression" and insert --expansion-- therefor

UNITED STATES PATENT AND TRADEMARK OFFICE
CERTIFICATE OF CORRECTION

PATENT NO.  : 5,228,415
DATED       : July 20, 1993
INVENTOR(S) : Thomas H. Williams It is certified that error appears in the above-identified patent and that said Letters Patent is hereby corrected as shown below:

Column 16, line 38, delete the word "exp." and insert --expansion-- therefor

Column 16, line 40, delete the word "crank" and insert --rotating cylinder-- therefor Signed and Sealed this Seventeenth Day of May, 1994

*Attest:*

BRUCE LEHMAN

*Attesting Officer*    *Commissioner of Patents and Trademarks*